US009696585B2

(12) United States Patent
Wang et al.

(10) Patent No.: US 9,696,585 B2
(45) Date of Patent: Jul. 4, 2017

(54) BACKLIGHT MODULE WITH OPTICAL CONTROL FILM

(71) Applicant: AU OPTRONICS CORPORATION, Hsin-Chu (TW)

(72) Inventors: Chiung-Han Wang, Hsin-Chu (TW); Yung-Hsin Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 14/830,920

(22) Filed: Aug. 20, 2015

(65) Prior Publication Data
US 2016/0076737 A1    Mar. 17, 2016

(30) Foreign Application Priority Data
Sep. 16, 2014   (TW) .............................. 103131925 A

(51) Int. Cl.
*G09F 13/04*        (2006.01)
*G02F 1/1335*       (2006.01)
(52) U.S. Cl.
CPC .............................. *G02F 1/133606* (2013.01)
(58) Field of Classification Search
CPC ......... G02F 1/133606; G02F 1/133611; G02F 1/133615
See application file for complete search history.

(56) References Cited

U.S. PATENT DOCUMENTS

| 2005/0002205 A1* | 1/2005 | Yu ..................... G02F 1/133603 362/555 |
| 2011/0051411 A1* | 3/2011 | Kim .................. G02F 1/133603 362/235 |
| 2012/0218752 A1* | 8/2012 | Sumitani ................. F21V 11/14 362/235 |

FOREIGN PATENT DOCUMENTS

| CN | 102483542 A | 5/2012 |
| CN | 102650383 A | 8/2012 |
| CN | 103383084 A | 11/2013 |
| JP | 2012142098 A | 7/2012 |
| TW | 200949382 A | 12/2009 |

OTHER PUBLICATIONS

Office Action issued in corresponding Taiwan patent application on Nov. 26, 2015.
Office Action issued in corresponding China patent application on Sep. 1, 2016.

* cited by examiner

*Primary Examiner* — Ali Alavi
(74) *Attorney, Agent, or Firm* — McClure, Qualey & Rodack, LLP

(57) ABSTRACT

The present invention provides a backlight module with optical control film, comprising a light source module and an optical control film. The backlight module comprises at least one block corresponding to at least one light source. The projection position of the light source on the block is surrounded by first light emitting holes. The first light emitting hole of the optical control film has a first opening on a surface toward the light source module and a second opening on the other surface away from the light source module. The position of distal end of the first opening relative to the light projection position is further away from the light projection position than the position of distal end of the second opening thereof relative to the light projection position in the direction parallel to the optical control film.

10 Claims, 6 Drawing Sheets

圖 3C

BACKLIGHT MODULE WITH OPTICAL CONTROL FILM

BACKGROUND OF THE INVENTION

1. Field of the Invention

The application relates to a backlight module, especially a direct type backlight module with optical control film.

2. Description of the Prior Art

In recent years, the technology of liquid crystal display device is gradually mature. With the increasing in consumer's preferences and requirements, the liquid crystal display device also gradually toward a thin type. To achieve the purpose of the thin type, each component thickness of the liquid crystal display device is required to be reduced, such as a display panel, an optical film, and a backlight module. Wherein the backlight module needs a light mixing space so that the thickness usually is larger; therefore it becomes the main target to be reduced.

FIG. 1A is a schematic diagram of a conventional backlight module. It comprises a supporting board 24, a porous reflecting sheet 22, a lower reflecting sheet 26 and a diffusing plate 23. A plurality of light sources 25 are disposed on the supporting board 24. The porous reflecting sheet 22 is disposed above the light sources 25 to distribute the light generated from the light sources 25. Wherein the distance between the porous reflecting sheet 22 and the diffusing plate 23 is H1, and the distance between the porous reflecting sheet 22 and the top surface of the light source 25 is H2. Multiple light emitting holes are disposed on the porous reflecting sheet 22. Accordingly, the porous reflecting sheet 22 can optionally reflect the light from the light source 25, or allow the light to pass through, to distribute the light to uniform the backlight.

However, when designing a thinner module, as shown in FIG. 1B, can reduce the distance H1 between the porous reflecting sheet 22 and the diffusing plate 23 to reduce the thickness. Because the first time light scatters from the light emitting holes, the restriction of the direct emitting area of the first time light is oversize, that is, the area (without the light emitting holes) where the light source 25 projects to the porous reflecting sheet 22 is oversize. The dark area is occurred above the light source corresponding to the diffusing plate 13.

SUMMARY OF THE INVENTION

In view of the above problems, in one aspect, the present invention provides a backlight module that can minimize the restriction of the direct emitting area of the first time light, resolve the blind spot problem above the light source.

In another aspect, the present invention provides a backlight module with thinner thickness and with uniform backlight.

The backlight module comprises a light source module and an optical control film. The light source module comprises at least one light source. The optical control film, disposed above the light source module and having a plurality of first light emitting holes wherein the optical control film distributes light generated from light sources to be emitted through the first light emitting holes of different positions. The optical control film comprises a least one block corresponding to at least one light source respectively; a light projection position of the light source in the block is surrounded by the first light emitting holes distributed within the block.

The first light emitting hole of the optical control film has a first opening on a surface toward the light source module and a second opening on the other surface away from the light source module; the position of distal end of the first opening relative to the light projection position is further away from the light projection position than the position of distal end of the second opening thereof relative to the light projection position in the direction parallel to the optical control film.

In comparison to the prior art, the backlight module of the present invention can minimize the restriction of the direct emitting area of the first time light, resolve the blind spot problem above the light source, and thereby indirectly reduce the thickness of the backlight module.

BRIEF DESCRIPTION OF THE DRAWINGS

FIGS. 3A-3D are schematic diagrams of optical control films in another embodiment in this invention.

DETAILED DESCRIPTION OF THE PREFERRED EMBODIMENT

Figures 1A, 1B:
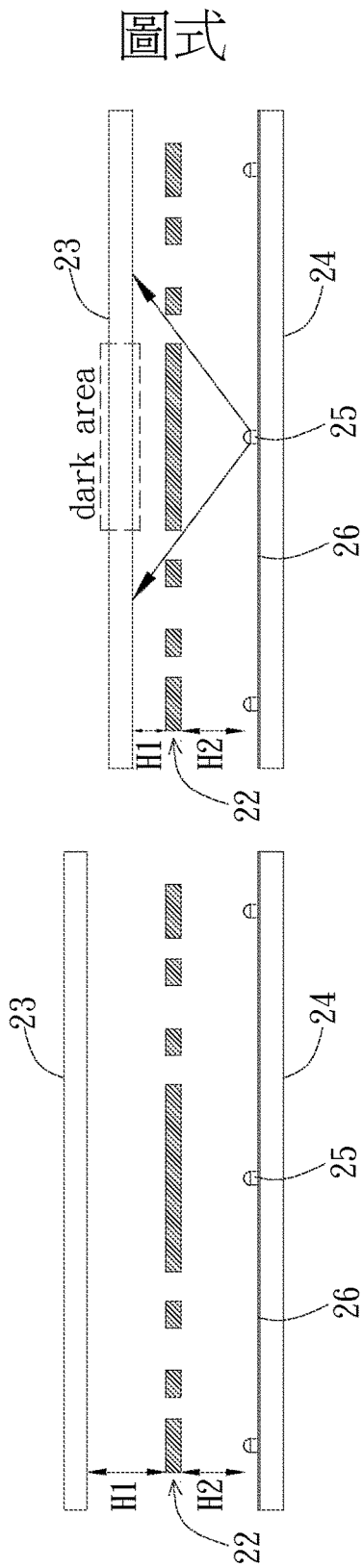
FIG. 1A is a schematic diagram of a conventional backlight module.
FIG. 1B is a schematic diagram of light of a conventional backlight module.
Figure 2A:
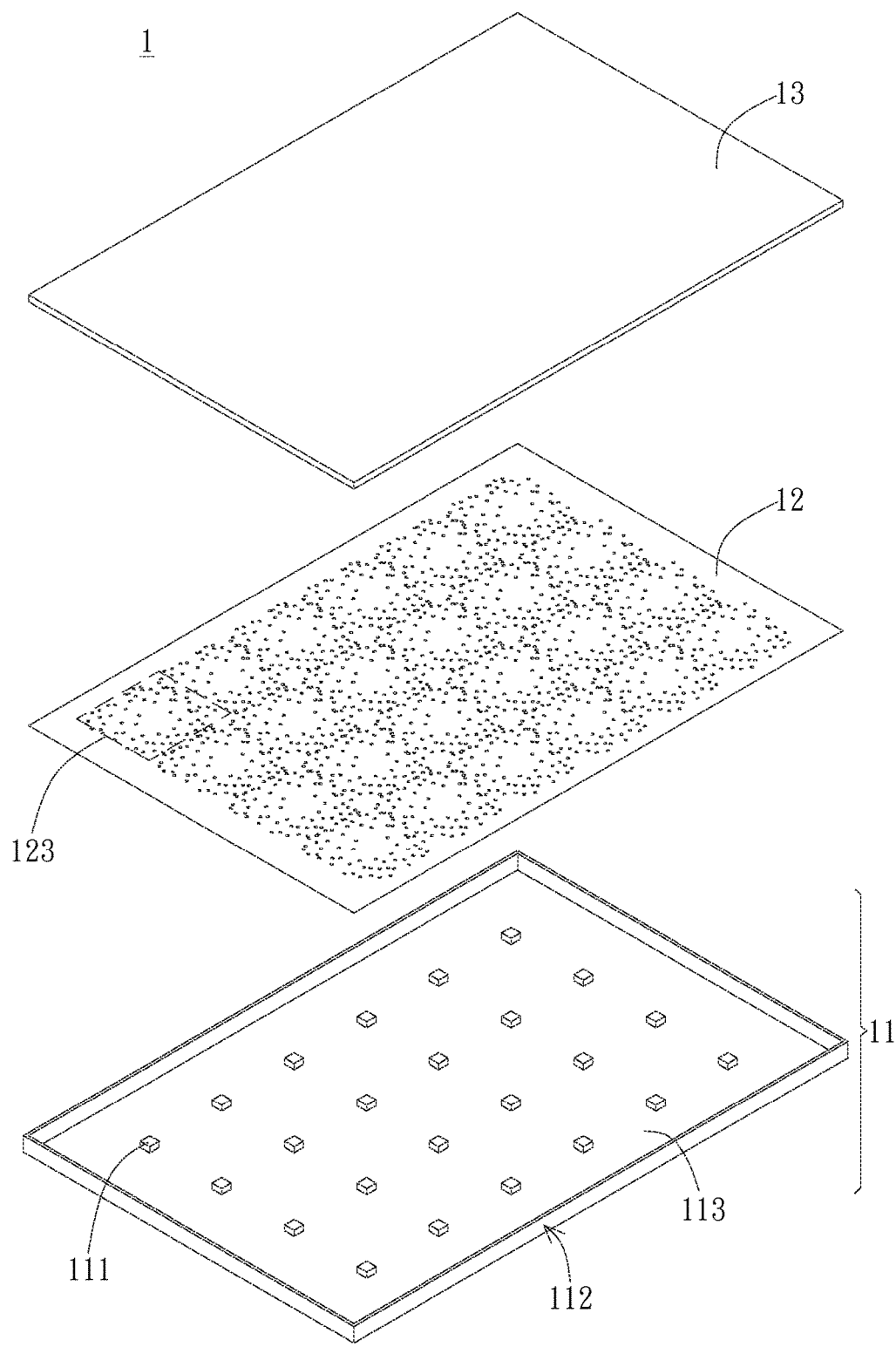
FIG. 2A is a schematic diagram of a backlight module in an embodiment in this invention.
Figure 2B:
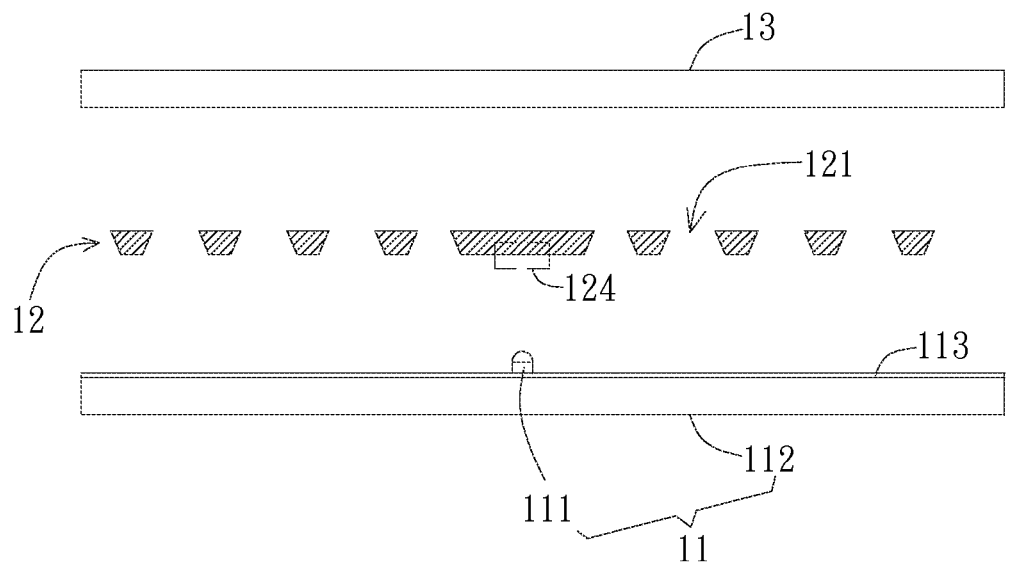
FIGS. 2B-2F are schematic diagrams of optical control films in an embodiment in this invention.

Please refer to the embodiments of FIGS. 2A and 2B. The backlight module 1 preferably comprises a light source module 11 and an optical control film 12. The light source module 11 comprises a plurality of light source 111, such as light-emitting diodes (LEDs). In addition, the light source module 11 preferably also comprises a supporting board 112 which carries light sources 111. In this embodiment, a lower reflecting sheet 113 can be installed selectively between the supporting board 112 and light sources 111. In a preferred embodiment, light sources 111 are arranged in a form of array on the supporting board 112, as show in FIG. 2A. The optical control film 12 is disposed above the light source module 11 wherein the optical control film 12 is preferably a porous reflecting sheet of high reflectivity and has a plurality of first light emitting holes 121 for distribute light generated from light sources 111 emitted through the first light emitting holes 121 of different positions. Light generated from the light source 111 can bounce back and forth between the optical control film 12 and the supporting board 112 or the lower reflecting sheet 113, and penetrate through the optical control film 12 through the first light emitting holes 121. Thus, by adjusting the density, shape and size of the emitting holes at different positions on the optical control film 12 the aperture ratio per unit area is changed thus to distribute the light emitted from the light source 111. In addition, a diffusing plate can be placed on top of the optical control film 12 to further homogenize the light emitted from the optical control film 12 whereas the optical control film 12 comprises blocks 123 that are corresponding to the light sources 111 individually, having a preferable arrangement that appears to be a matrix form to correspond to each light source 111. The light projection position 124 of the light source 111 on the block is surrounded by a plurality of the first light emitting holes 121 of the corresponding block of the optical control film.

Figure 2C:
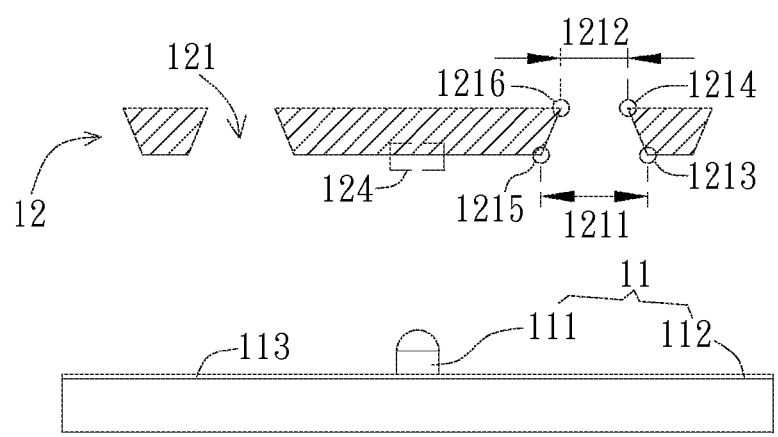

Furthermore, as shown in FIG. 2C, the first light emitting hole 121 of the optical control film 12 has a first opening 1211 on the front surface toward the light source module 11 and a second opening 1212 on the rear surface away from the light source module 11. The position of distal end 1213 of the first opening 1211 relative to the light projection position 124 is further away from the light projection position 124 in the direction parallel to the optical control film 12 than the position of distal end 1214 of the second opening 1212 thereof relative to the light projection position 124; the position of near end 1215 of the first opening 1211 relative to the light projection position 124 is more closer to the light projection position 124 in the direction parallel to the optical control film 12 than the position of near end 1216 of the second opening 1212 thereof relative to the light projection position 124. In short, the surface area of the first opening 1211 is larger than the surface area of the second opening 1212 wherein the opening is preferably to be a circular form and the diameter of the second opening 1212 is preferably designed to be less than 0.3 mm. As illustrated in the figures, the first light emitting hole 121 of the embodiment will appear to be in a funnel-shaped form alike. In this embodiment, the first opening 1211 and the second opening 1212 are both circular; the distal end and the near end refer to the partial arc lines of the farthest and closest edge of the opening edge to the light projection position; and these partial arc lines are preferably smaller than the length of the semi-circumference. However, when the first opening 1211 or the second opening 1212 is not circular, the distal end and near end can also be composed of the partial edge of the opening.

Figure 2D:
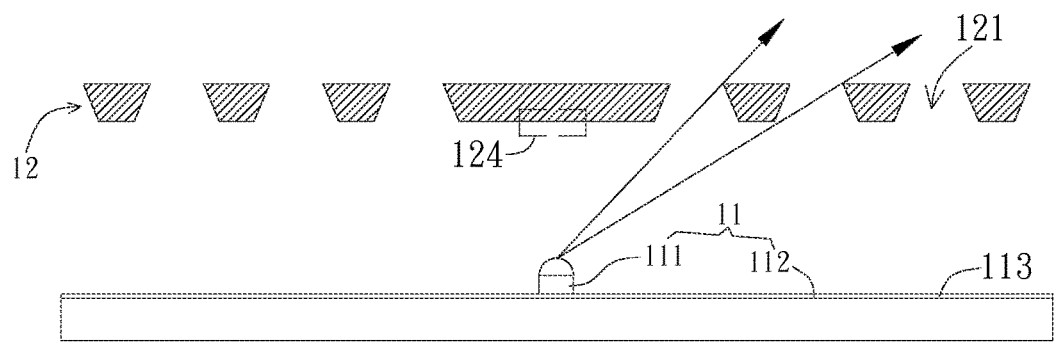

According to the design of the embodiment, as shown in the schematic diagram of the light of FIG. 2D, partial of the first time light will first be blocked and then emitted by the inner wall of the distal side away from the light projection position. Compared with the design method of the light emitting hole of the prior art, the optical control film designed in the embodiment can reduce the condition that the first time light is directly scattered out through the first light emitting hole. Accordingly, by applying the non-vertical first light emitting hole 121 designed in the embodiment, from the layout of the optical control film 12, it can be more closer to the light projection position 124, shorten the non porous area of the light projection position 124, thereby minimize the restriction of the direct emitting area of the first time light, and resolve the blind spot problem above the light source.

Figure 2E:
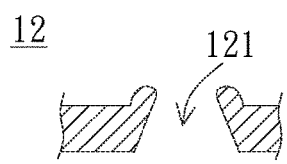

It is worth mentioning that, in one embodiment, as shown in FIG. 2E, the first light emitting holes 121 on the optical control film 12 can be created by puncturing the optical control film with flushing needles. Under this circumstance, the tail ends of the punctured holes of first light emitting holes 121 may have the condition of protruding fringe wherein since the protruding portion increases the height of the hole surface, thus it increases the blocking area of the first time light and, as described previously, the first light emitting holes 121 can get closer to the light projection position 124.

Figure 2F:
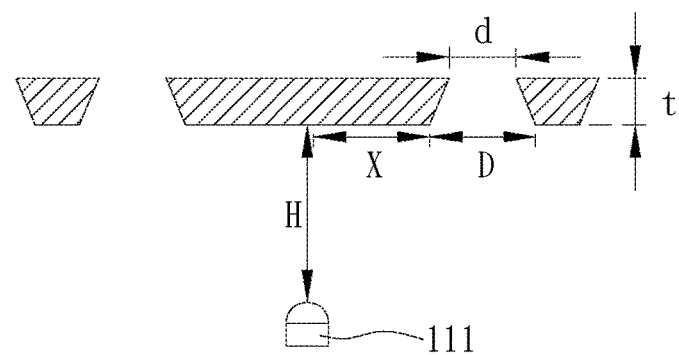

Further explanation is provided, as shown in FIG. 2F. Defining the distance between the near end and the distal end of the first opening of the first light emitting hole in the aforementioned embodiment as D, the distance between the near end and the distal end of the second opening thereof as d, the thickness of the optical control film as t, the vertical distance from the top spot of the light source to the optical control film as H, the distance from the light projection position to the near end of the first opening as X, the following formula is satisfied:

$$\frac{H}{X} < \frac{2t}{D+d}.$$

According to the design of the embodiment, through the variation of the distance d between the near end and the distal end of the second opening of the first light emitting hole, the variation of slope of the inner wall of the first light emitting hole can be controlled so that the first time light will not directly penetrate and the distance X can be shortened. Therefore, the first light emitting holes of the optical control film can further be set to distribute inward to reduce the length of X. Thus, the restriction of the direct emitting area of the first time light can be minimized and the blind spot problem above the light source can be resolved. Indirectly, the height from the diffusing plate to the optical control film can be reduced and thereby the thickness of the backlight module can be reduced.

Figure 3A:
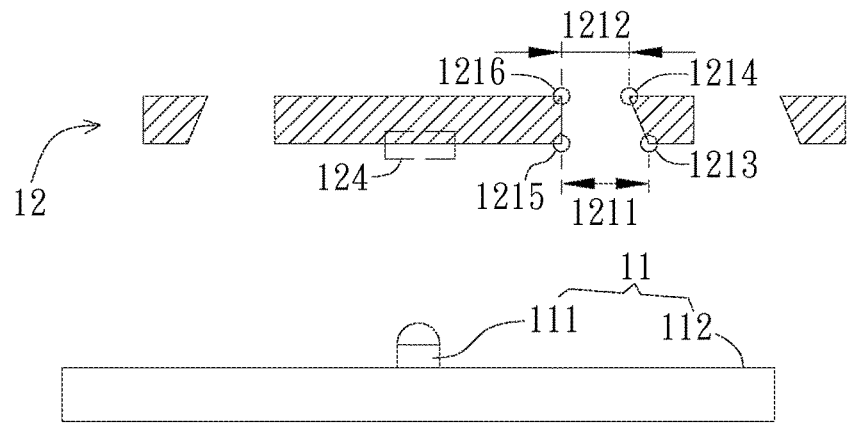

In another embodiment of the present invention, as shown in FIG. 3A, the distances from the position of near end of the first opening 1211 of the first light emitting hole relative to the light projection position and the position of near end of the second opening 1212 thereof relative to the light projection position to the light projection position 124 respectively are the same in the direction parallel to the optical control film. That is to say, the inner wall between both openings near the light projection position is of a vertical form whereas the distal inner wall between both openings away from the light projection position still is in an oblique form.

Figure 3B:
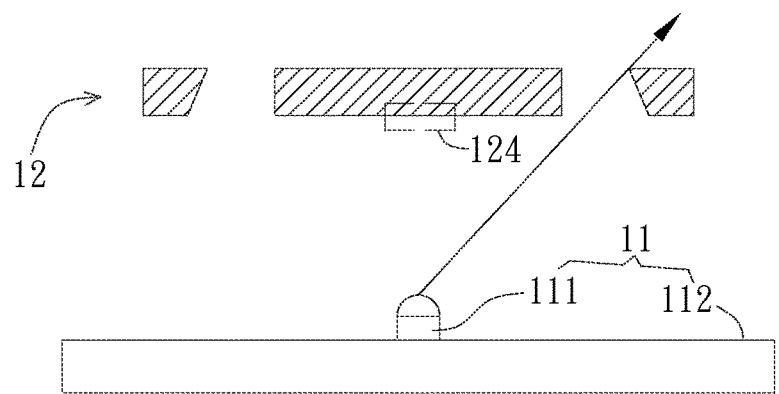

As shown in the schematic diagram of the light of FIG. 3B, partial of the first time light will be blocked by the inner wall of the distal side away from the light projection position. Compared with the design of the vertical-typed light emitting hole in the past, the design in the embodiment can reduce the condition that the first time light is directly scattered out through the first light emitting hole. Accordingly, by applying the non-vertical first light emitting hole designed in the embodiment, from the layout of the first light emitting holes, it can be more closer to the light projection position 124, shorten the non porous area of the light projection position 124, thereby minimize the restriction of the direct emitting area of the first time light, and resolve the blind spot problem above the light source.

Similarly, as shown in FIG. 3C, in a different embodiment, the tail ends of the punctured holes of first light emitting holes 121 may have the condition of protruding fringe wherein since the protruding portion increases the height of the hole surface, thus it increases the blocking area of the first time light.

Figure 3D:
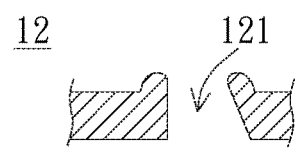
Figure 3D:
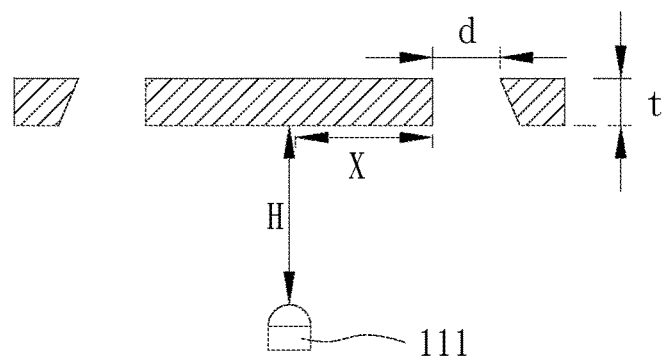

Further explanation is provided, as shown in FIG. 3D. Defining the distance between the near end and the distal end of the second opening of the first light emitting hole in the aforementioned embodiment as d, the thickness of the optical control film as t, the vertical distance from the top spot of the light source to the optical control film as H, the distance from the light projection position to the near end of the first opening as X, the following formula is satisfied:

$$\frac{H}{X} < \frac{t}{d}.$$

According to the design of the embodiment, through the variation of the distance d between the near end and the distal end of the second opening of the first light emitting hole, the variation of slope of the inner wall of the first light emitting hole can be controlled so that the first time light will not directly penetrate and the distance X can be shortened. Therefore, the first light emitting holes of the optical control film can further be set to distribute inward to reduce the length of X. Thus, the restriction of the direct emitting area of the first time light can be minimized and the blind spot problem above the light source can be resolved. Indirectly, the height from the diffusing plate to the optical control film can be reduced and thereby the thickness of the backlight module can be reduced.

Figure 4A:
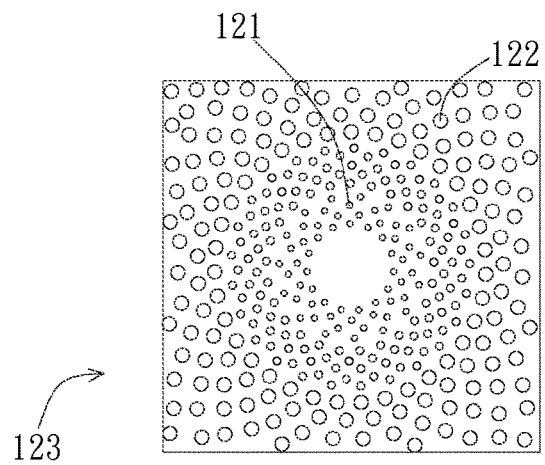
FIGS. 4A-4C are schematic diagrams of optical control films in another embodiment in this invention.
Figure 4B:
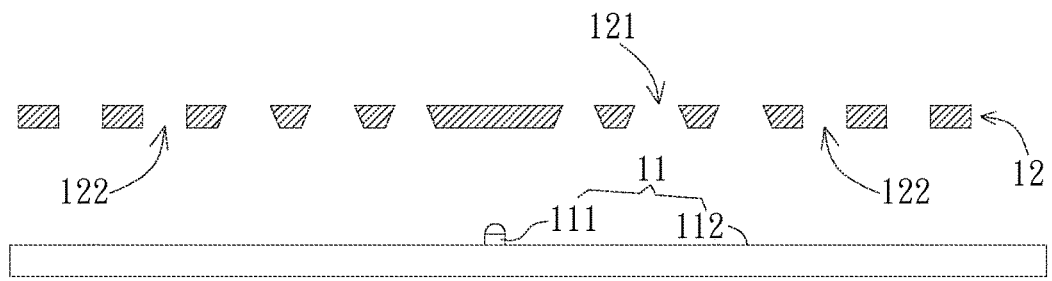
Figure 4C:
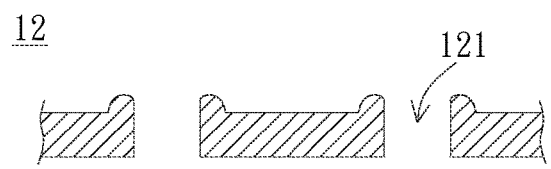

Another embodiment of the present invention, as shown in FIG. 4A and FIG. 4B, is mainly to set a plurality of the second light emitting holes 122 surrounding the periphery of the first light emitting holes within the block 123. Among them, the distances from the positions of distal ends of the second opening 122, on both relative sides of the optical control film 12 and relative to the light projection position, to the light projection position respectively are the same in the direction parallel to the optical control film 12. In short, the second light emitting hole is a vertical-typed hole, preferably a cylindrical hole. Similarly, in a different embodiment, as shown in FIG. 4C, the tail ends of the punctured holes may also have the condition of protruding fringe. Variations and adjustment methods of the rest of embodiments can be derived from the aforementioned embodiments and therefore will not be repeated further here.

In comparison to the prior art, the backlight module of the present invention can minimize the restriction of the direct emitting area of the first time light, resolve the blind spot problem above the light source, and thereby indirectly reduce the thickness of the backlight module.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A backlight module, comprising:
a light source module, which comprises at least one light source; and
an optical control film, disposed above the light source module and having a plurality of first light emitting holes wherein the optical control film distributes light generated from the light sources to be emitted through the first light emitting holes of different positions; the optical control film comprises at least one block corresponding to the at least one light source respectively; a light projection position of the light source in the block is surrounded by the first light emitting holes distributed within the block;
whereas the first light emitting hole of the optical control film has a first opening on a surface toward the light source module and a second opening on the other surface away from the light source module; the position of distal end of the first opening relative to the light projection position is further away from the light projection position than the position of distal end of the second opening thereof relative to the light projection position in the direction parallel to the optical control film; wherein the first light emitting hole has a inner wall whereas the distal portion of the inner wall of the same first light emitting hole away from the light projection position stretches gradually from the first opening to the second opening closer toward the light projection position.

2. The backlight module as claimed in claim 1, wherein the second opening is of a circular shape and the diameter thereof is less than 0.3 mm.

3. The backlight module as claimed in claim 1, wherein the first light emitting hole is shaped as a funnel form.

4. The backlight module as claimed in claim 1, wherein the surface area of the first opening is larger than the surface area of the second opening.

5. The backlight module as claimed in claim 1, wherein the position of near end of the first opening relative to the light projection position is more closer to the light projection position than the position of near end of the second opening thereof relative to the light projection position in the direction parallel to the optical control film.

6. The backlight module as claimed in claim 5, wherein defining the distance between the near end and the distal end of the first opening as D, the distance between the near end and the distal end of the second opening as d, the thickness of the optical control film as t, the vertical distance from the top spot of the light source to the optical control film as H, the distance from the light projection position to the near end of the first opening as X, the following formula is met:

$$\frac{H}{X} < \frac{2t}{D+d}.$$

7. The backlight module as claimed in claim 1, wherein the distances from the position of near end of the first opening relative to the light projection position and the position of near end of the second opening relative to the light projection position to the light projection position respectively are the same in the direction parallel to the optical control film.

8. The backlight module as claimed in claim 7, wherein defining the distance between the near end and the distal end of the second opening as d, the thickness of the optical control film as t, the vertical distance from the top spot of the light source to the optical control film as H, the distance from the light projection position to the near end of the first opening as X, the following formula is met:

$$\frac{H}{X} < \frac{t}{d}.$$

9. The backlight module as claimed in claim 1, wherein the optical control film has a plurality of second light emitting holes; within each block, the second light emitting holes are surrounding the periphery of the first light emitting holes; the distances from the positions of distal ends of the second opening, on both relative sides of the optical control film and relative to the light projection position, to the light projection position respectively are the same in the direction parallel to the optical control film.

10. The backlight module as claimed in claim 9, wherein the second light emitting hole is of a cylindrical shape.

* * * * *